US012365191B2

(12) United States Patent
d'Armancourt et al.

(10) Patent No.: US 12,365,191 B2
(45) Date of Patent: Jul. 22, 2025

(54) MEDIA GUIDE ASSEMBLY FOR PRINTING APPARATUS

(71) Applicant: Hand Held Products, Inc., Charlotte, NC (US)

(72) Inventors: Sebastien d'Armancourt, Singapore (SG); Han Tiong Tong, Singapore (SG); Chin Young Wong, Singapore (SG)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/636,150

(22) Filed: Apr. 15, 2024

(65) Prior Publication Data

US 2024/0253373 A1 Aug. 1, 2024

Related U.S. Application Data

(63) Continuation of application No. 17/447,888, filed on Sep. 16, 2021, now Pat. No. 11,987,047, which is a (Continued)

(51) Int. Cl.
*B41J 15/04* (2006.01)
*B41J 11/00* (2006.01)
(Continued)

(52) U.S. Cl.
CPC ......... *B41J 15/048* (2013.01); *B41J 11/0045* (2013.01); *B41J 11/0095* (2013.01); (Continued)

(58) Field of Classification Search
CPC .. B41J 15/048; B41J 11/0045; B41J 11/0095; B41J 15/16; B65H 5/38; B65H 7/14; (Continued)

(56) References Cited

U.S. PATENT DOCUMENTS 5,646,747 A 7/1997 Watanabe et al.
8,453,924 B1 6/2013 Turocy et al.
(Continued)

FOREIGN PATENT DOCUMENTS

JP 2012-180139 A 9/2012
JP 2013-184765 A 9/2013

OTHER PUBLICATIONS

U.S. Appl. No. 17/447,888, filed Sep. 16, 2021, U.S. Pat. No. 11,987,047, Patented.
(Continued)

*Primary Examiner* — Henok D Legesse
(74) *Attorney, Agent, or Firm* — Alston & Bird LLP

(57) ABSTRACT

Various embodiments illustrated herein disclose a printing apparatus comprising a media supply spool configured to supply print media along a media path. The printing apparatus further comprises a first media sensor positioned in a first plane in the printing apparatus. Further, the printing apparatus comprises a second media sensor positioned in a second plane in the printing apparatus. Additionally, the printing apparatus comprises a first media guide defining a section of the media path, wherein extremities of the first media guide are positioned to be at a negative offset from the second plane.

20 Claims, 13 Drawing Sheets

Related U.S. Application Data continuation of application No. 16/941,145, filed on Jul. 28, 2020, now Pat. No. 11,148,441.

(51) Int. Cl.
*B41J 15/16* (2006.01)
*B65H 5/38* (2006.01)
*B65H 7/14* (2006.01)

(52) U.S. Cl.
CPC ................ *B41J 15/16* (2013.01); *B65H 5/38* (2013.01); *B65H 7/14* (2013.01); *B65H 2404/51* (2013.01); *B65H 2404/611* (2013.01); *B65H 2404/6111* (2013.01); *B65H 2404/612* (2013.01)

(58) Field of Classification Search
CPC .......... B65H 2404/51; B65H 2404/611; B65H 2404/6111; B65H 2404/612
See application file for complete search history.

(56) References Cited

U.S. PATENT DOCUMENTS

| | | | | |
|---|---|---|---|---|
| 9,505,576 | B2 | 11/2016 | Sasaki et al. | |
| 10,532,589 | B2 | 1/2020 | Yokota | |
| 11,148,441 | B1 | 10/2021 | D'Armancourt et al. | |
| 11,987,047 | B2 * | 5/2024 | d'Armancourt | B41J 15/16 |
| 2008/0074458 | A1 | 3/2008 | Niioka et al. | |
| 2009/0196634 | A1 | 8/2009 | Satoh et al. | |
| 2010/0156040 | A1 | 6/2010 | Kobayashi | |
| 2014/0197268 | A1 | 7/2014 | Zhang et al. | |

OTHER PUBLICATIONS

U.S. Appl. No. 16/941,145, filed Jul. 28, 2020, U.S. Pat. No. 11,148,441, Patented.

Advisory Action (PTOL-303) Mailed on Dec. 15, 2023 for U.S. Appl. No. 17/447,888, 3 page(s).

EP Office Action Mailed on Oct. 5, 2023 for EP Application No. 21188089, 5 page(s).

Examiner Interview Summary Record (PTOL-413) Mailed on Dec. 19, 2023 for U.S. Appl. No. 17/447,888, 2 page(s).

Extended European search report Mailed on Nov. 26, 2021 for EP Application No. 21188089, 10 pages.

Final Rejection Mailed on Oct. 6, 2023 for U.S. Appl. No. 17/447,888, 12 page(s).

Non-Final Rejection Mailed on Jun. 8, 2023 for U.S. Appl. No. 17/447,888, 18 page(s).

Notice of Allowance and Fees Due (PTOL-85) Mailed on Jan. 18, 2024 for U.S. Appl. No. 17/447,888, 7 page(s).

Notice of Allowance and Fees Due (PTOL-85) Mailed on Jun. 16, 2021 for U.S. Appl. No. 16/941,145, 19 pages.

* cited by examiner

MEDIA GUIDE ASSEMBLY FOR PRINTING APPARATUS

CROSS-REFERENCE TO RELATED APPLICATIONS

This application is a continuation of U.S. application Ser. No. 17/447,888, filed Sep. 16, 2021, which is a continuation of U.S. application Ser. No. 16/941,145, filed Jul. 28, 2020 (now U.S. Pat. No. 11,148,441, issued Oct. 19, 2021), the entire contents of which are incorporated herein by reference.

TECHNICAL FIELD

Example embodiments of the present disclosure relate generally to a printing apparatus and, more particularly, to a media path in the printing apparatus.

BACKGROUND

A typical printer may include a media supply spool and a print head positioned apart from the media supply spool. The media supply spool may be configured to cause traversal of print media (wrapped around the media supply spool) along media path towards the print head. Thereafter, the print head may be configured to print content on the print media.

BRIEF SUMMARY

Various embodiments illustrated herein disclose a printing apparatus comprising a media supply spool configured to supply print media along a media path. The printing apparatus further comprises a first media sensor positioned in a first plane in the printing apparatus. Further, the printing apparatus comprises a second media sensor positioned in a second plane in the printing apparatus. Additionally, the printing apparatus comprises a first media guide defining a section of the media path, wherein extremities of the first media guide are positioned to be at a negative offset from the second plane.

Various embodiments illustrated herein disclose a media guide assembly for a printing apparatus. The media guide assembly comprises a first media guide configured to be define a section of a media path in the printing apparatus, wherein the first media guide comprises a first media guide section having an arch profile with a first radius of curvature. The first media guide section is configured to receive a first media sensor. At least the arch profile of the first media guide section facilitates a print media, traversing along the media path, to abut with the first media sensor.

Various embodiments illustrated herein disclose a printing apparatus comprising a media supply spool configured to supply print media along a media path. Further, the printing apparatus comprises a media sensor comprising a light transmitter and a light receiver, wherein the light transmitter is positioned to be spaced apart from the media path along a vertical axis of the printing apparatus, wherein light receiver is positioned to be spaced apart from the media path along the vertical axis of the printing apparatus, wherein the media path is defined to be between the light receiver and the light transmitter. Further, the printing apparatus comprises a first media guide defining a section of the media path, wherein the first media guide comprises a first media guide section a first planar section and a second planar section, wherein the first media guide section is defined to be between the first planar section and the second planar section, wherein the light receiver is positioned on the first media guide section, and wherein the first planar section and the second planar section are defined to be above a position of the light transmitter along the vertical axis of the printing apparatus.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF THE INVENTION

Figure 1A:
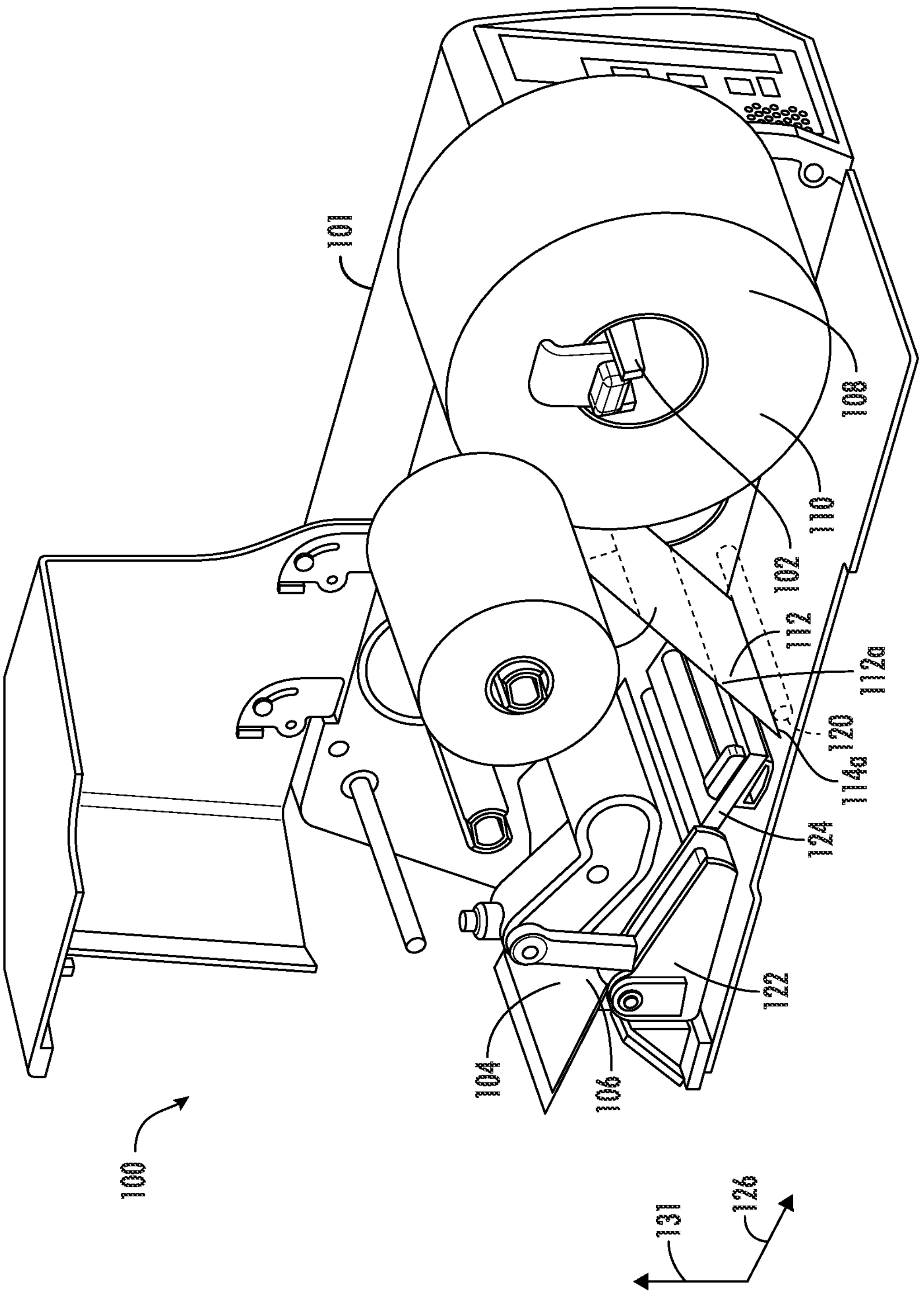
FIGS. 1A-1C illustrate perspective views and a side view of a printing apparatus, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, one or more particular features, structures, or characteristics from one or more embodiments may be combined in any suitable manner in one or more other embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

The term "electronically coupled," "electronically coupling," "electronically couple," "in communication with," "in electronic communication with," or "connected" in the present disclosure refers to two or more components being connected (directly or indirectly) through wired means (for example but not limited to, system bus, wired Ethernet) and/or wireless means (for example but not limited to, Wi-Fi, Bluetooth, ZigBee), such that data and/or information may be transmitted to and/or received from these components.

The terms "printer" and "printing apparatus" refer to a device that may imprint texts, images, shapes, symbols, graphics, and/or the like onto print media to create a persistent, human-viewable representation of the corresponding texts, images, shapes, symbols, graphics, and/or the like. Printers may include, for example, laser printers.

The terms "print media," "physical print media," "paper," and "labels" refer to tangible, substantially durable physical material onto which text, graphics, images and/or the like may be imprinted and persistently retained over time. Physical print media may be used for personal communications, business communications, and/or the like to convey prose expression (including news, editorials, product data, academic writings, memos, and many other kinds of communications), data, advertising, fiction, entertainment content, and illustrations and pictures. Physical print media may be generally derivatives of wood pulp or polymers, and includes conventional office paper, clear or tinted acetate media, news print, envelopes, mailing labels, product labels, and other kinds of labels. Thicker materials, such as cardstock or cardboard may be included as well. More generally, print media may be used to receive ink, dye, or toner, or may be a media whose color or shading can be selectively varied (for example, through selective application of heat, light, or chemicals) to create a persistent visual contrast (in black and white, shades of gray, and/or colors) that can be perceived by the human eye as texts, images, shapes, symbols, or graphics. In another example, the print media may be chemically treated such that when light falls on the print media, the color of the print media changes. Such print media may be used in the laser printers. In exemplary embodiments discussed throughout this document, reference may be made specifically to "paper" or "labels;" however, the operations, system elements, and methods of such exemplary applications may be applicable to media other than or in addition to the specifically mentioned "paper" or "labels."

In some embodiments, the print media may be divided into a plurality of labels through perforations defined along a width of the print media. In some alternative embodiments, the print media may be divided into the plurality of labels by one or more marks at a defined distance from each other along the length of the print media. In an example embodiment, a contiguous stretch of the print media between two consecutive marks or two consecutive perforations corresponds to a label of a plurality of labels. In some examples, each of the plurality of labels includes a printable portion on which content may be printed using a printer apparatus. In some implementations, the printable portion on the label may correspond to the complete label. In such an implementation, the content is printable on the complete label. In another implementation, an area of the printable portion is less than the area of the label.

The term "media path" may correspond to a path traversed by print media in a printing apparatus. For example, the print media may follow a path on the printing apparatus to reach the print head for the printing operation. In some examples, the printing apparatus may include one or more components such as one or more media guide assemblies, rollers, motorized rollers, and/or the like that may be placed along the media to facilitate the traversal of the print media along the media path.

Typically, in a printing apparatus, a print media traverses along a media path from a media supply spool towards a print head. In some examples, the printing apparatus may further include a media sensor that may be positioned adjacent to the media path. The media sensor may be configured to generate signal deterministic of a location of the print media along the media path. The location of the print media may be utilized, for example, to determine the location of the print media with respect to the print head, and to determine if the print media is aligned with the print head for the printing operation. For accurate operation of the media sensor, a predetermined tension or stretch needs to be maintained in the print media, as the print media traverses along the media path.

Apparatuses described herein disclose a printing apparatus that includes the media supply spool, a print head, a media guide assembly, and a media sensor. The media supply spool may cause the print media to traverse along a media path towards the print head (hereinafter a direction of the traversal of the media path from the media supply spool towards the print head is referred to as print direction). The media guide assembly may define a section of the media path along which the print media may traverse. In some examples, the media guide assembly may have a predetermined profile such as, but not limited to, an arch profile. Additionally, the media guide assembly may be configured to receive the media sensor such that the media sensor is disposed on the media guide assembly.

In some examples, the predetermined profile of the media guide assembly facilitates the print media to be in contact of the media sensor irrespective of the tension or the stretch in the print media. Since the media sensor is always in contact with the print media, the media sensor generates signals that are indicative of accurate locations of the print media.

Figure 1B:
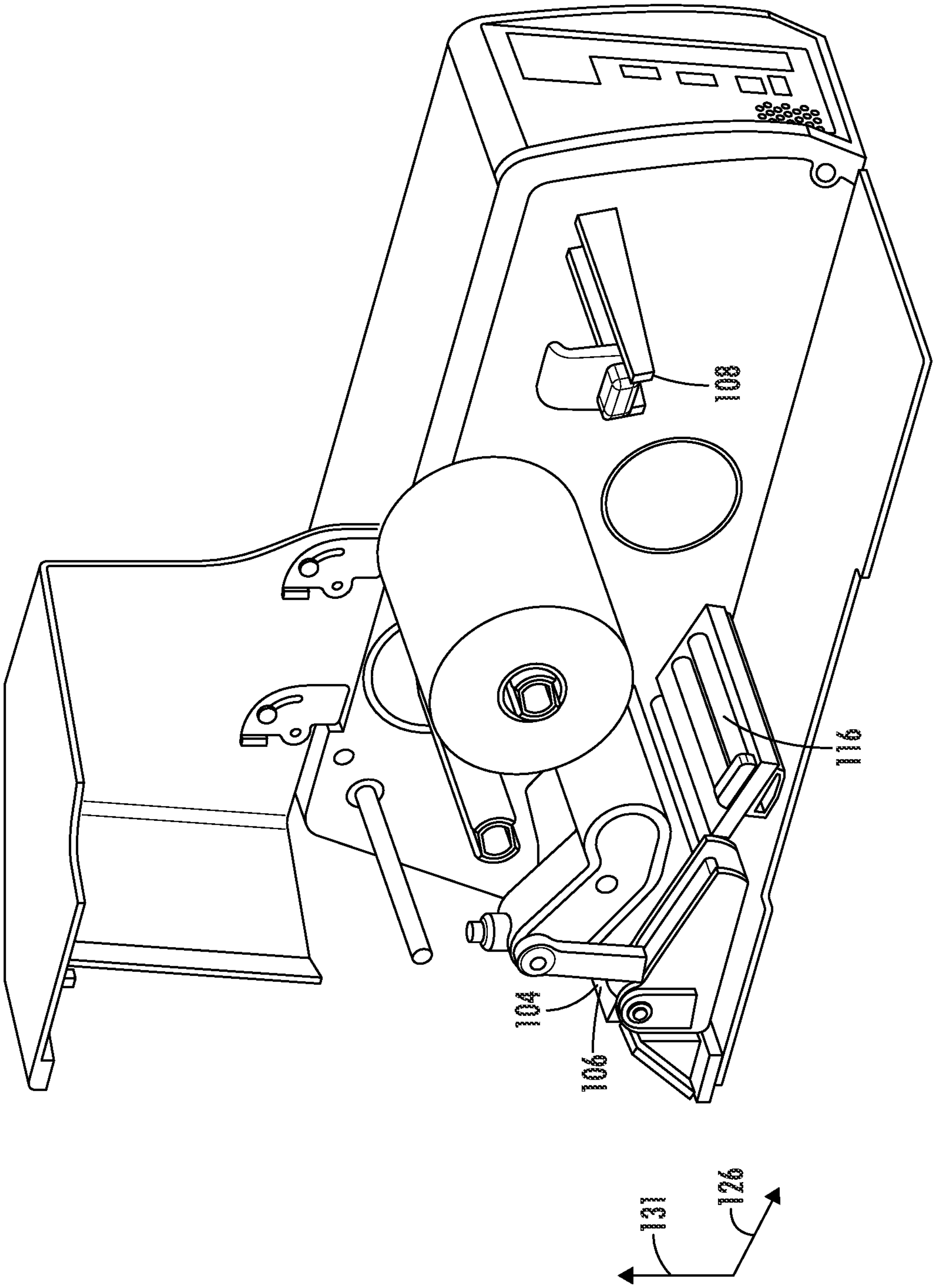
Figure 1C:
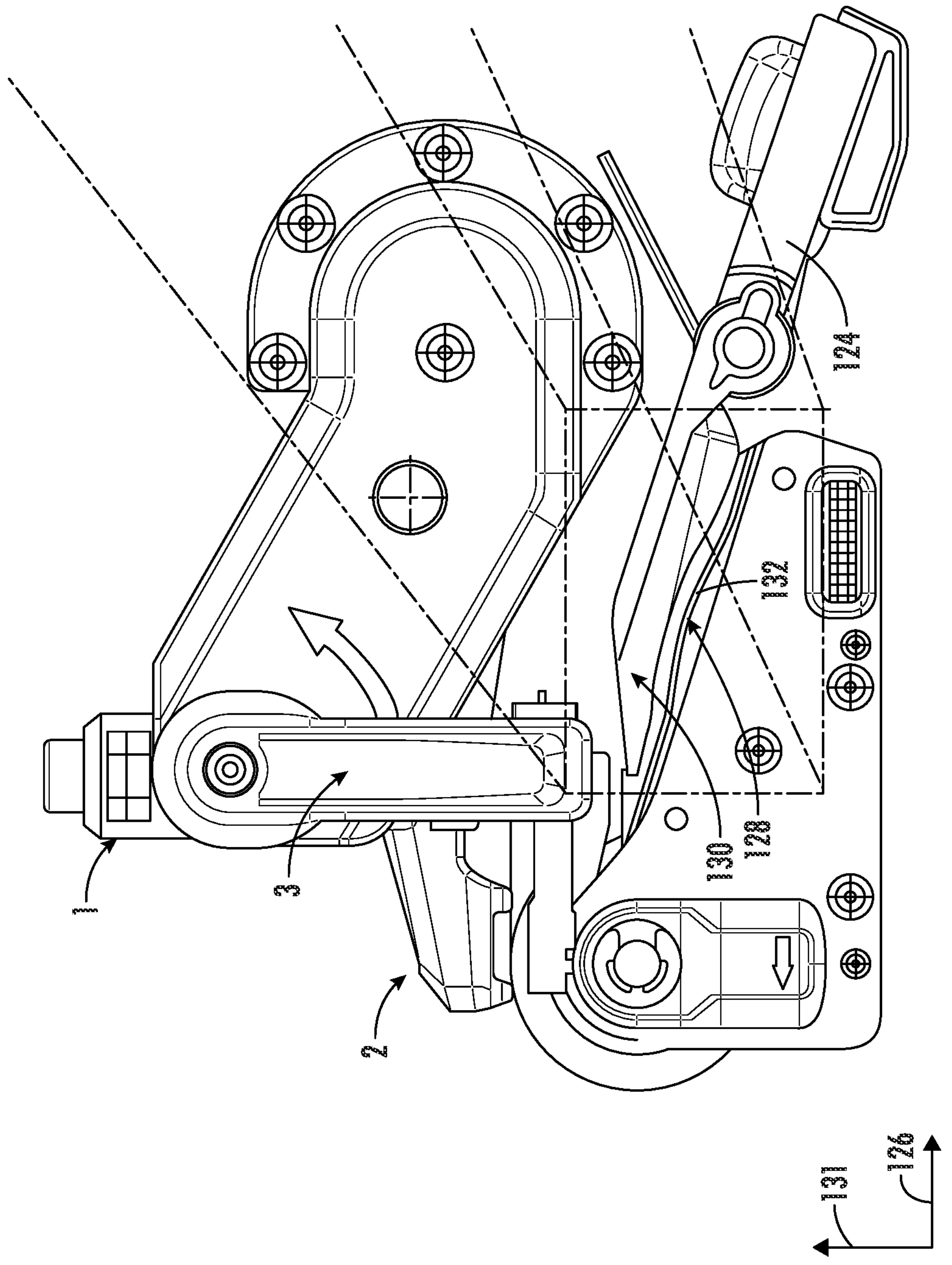

FIGS. 1A-1C illustrate perspective views and a side view of a printing apparatus 100, according to one or more embodiments described herein. The printing apparatus 100 may include a media hub 102, a printer media output 104, and a print head 106. In some examples, the printing apparatus 100 may include additional components such as, a ribbon drive assembly, a ribbon take-up hub, an image verifier, and/or the like. For the purpose of brevity and ongoing description, the additional components have not been described.

In an example embodiment, the media hub 102 may be coupled to a back spine 101 of the printing apparatus 100 and may be configured to receive a media supply spool 108. In an example embodiment, the media supply spool 108 may correspond to a roll of a print media 110 that may be a continuous media or may, in some example embodiments, include a plurality of labels 112 that are defined (in or on the print media 110) by means of one or more perforations or one or more marks. In an example embodiment, the plurality of labels 112 in or on the print media 110 may correspond to portions on which the printing apparatus 100 may be configured to print content. In some examples, the one or more perforations and/or the one or more marks may define an edge (e.g., edge 114*a*) between two adjacent labels. Further, each label of the plurality of labels 112 has two edges (e.g., the label 112*a* has edges 114*a* and 114*b*). Similarly, the label 112*b* has the edges 114*b* and 114*c*. The edge 114*b* is common edge for both the labels 112*a* and 112*b*.

In an example embodiment, the media hub 102 may be coupled to a first electrical drive (not shown) that actuates the media hub 102. On actuation, the media hub 102 causes the media supply spool 108 to rotate, which further causes the media supply spool 108 to supply the print media 110 to the print head 106 along a media path 116 (shaded in FIG. 1B). In an example embodiment, along the media path 116, the print media 110 traverses from the media supply spool 108 to the print head 106 and the printer media output 104. Such direction of the print media traversal from the media supply spool 108 to the printer media output 104 is referred to as a print direction. In an example embodiment, the media supply spool 108 is rotated in an anti-clockwise direction to cause the print media 110 to traverse in the print direction. In some examples, the media hub 102 may be actuated to cause the print media 110 to traverse in a direction opposite to the print direction (i.e., from the printer media output 104 to the media supply spool 108). Hereinafter, the direction of the media traversal opposite to the print direction is referred to as the retract direction. In an example embodiment, the media supply spool 108 is rotated in a clockwise direction to cause the print media 110 to traverse in the retract direction.

Additionally or alternately, the printing apparatus 100 may include a platen roller 120 and/or a media guide assembly 122 that may be placed adjacent to the media path 116. In some examples, the platen roller 120 and the media guide assembly 122 may, either individually or in combination, facilitate the traversal of the print media 110 along the media path 116. In an example embodiment, the platen roller 120 may be configured to be coupled to the first electrical drive (not shown) that may facilitate the movement/rotation of the platen roller 120. In some examples, the platen roller 120 may be positioned downstream of the media hub 102 and upstream of the print head 106, along the print direction. Additionally or alternatively, the media guide assembly 122 may be positioned downstream of the platen roller 120 and upstream of the print head 106, along the print direction. Accordingly, the media guide assembly 122 may be positioned between the platen roller 120 and the print head 106. Additionally or alternatively, the printing apparatus 100 may include additional platen roller (not shown) that may be positioned downstream of the print head 106, without departing from the scope of the disclosure. In some examples, the scope of the disclosure is not limited to the platen roller 120 coupled to the first electrical drive. In an example embodiment, the platen roller may correspond to an idle roller that may be configured to rotate based on the movement of the print media 110 along the media path 116. In some examples, the platen roller 120 may correspond to a rod that is coupled to the back spine 101 of the printing apparatus 100. In such an example, the platen roller 120 may have a smooth surface allowing the print media 110 to slide on the surface of the platen roller 120.

In some examples, the platen roller 120 may be configured to define a route for the print media 110 to traverse. For example, initially, the print media 110 may traverse in a downward direction, along a vertical axis 131 of the printing apparatus 100, from the media supply spool 108 to the platen roller 120. Thereafter, the platen roller 120 may cause the print media 110 to traverse in an upward direction, along the vertical axis 131 of the printing apparatus 100, towards the media guide assembly 122.

In some examples, the scope of the disclosure is not limited to having the platen roller 120. In an example embodiment, the printing apparatus 100 may include a media guide extension portion 124 that may be coupled to the media guide assembly 122. The media guide extension portion 124 may extend out from the media guide assembly 122 along a longitudinal axis 126 of the printing apparatus 100. Further, the media guide extension portion 124 may extend in the retreat direction (i.e., opposite to the print direction) from the media guide assembly 122. In some examples, the printing apparatus 100 may include a combination of the platen roller 120 and the media guide extension portion 124. However, for the purpose of ongoing description, the printing apparatus 100 is considered to include the media guide extension portion 124.

Referring to FIG. IC, in some examples, the media guide assembly 122 may include a first media guide 128 and a second media guide 130. The second media guide 130 may positioned in the printing apparatus 100 such that the second media guide 130 is spaced apart from the first media guide 128 along the vertical axis 131 of the printing apparatus 100. Accordingly, a gap 132 is defined between the first media guide 128 and the second media guide 130. In some examples, the gap 132 may define a section of the media path 116 through which the print media 110 traverses. The structure of the first media guide 128 and the second media guide 130 is described in conjunction with FIG. 2 and FIG. 3, respectively. Further, the assembled structure and operation the media guide assembly 122 is further described in conjunction with FIG. 4-11.

The print head 106 may correspond to a component that is configured to print the content on the print media 110. In an example embodiment, the print head 106 may include a plurality of heating elements (not shown) that are energized and pressed against the print media 110 to perform a print operation. In operation, the print head 106 applies heat on the print media 110 causing the print media 110 to change color. Accordingly, the print head 106 facilitates printing of the content on the print media 110. In some examples, where the printing apparatus 100 includes ribbon drive assembly and ribbon take-up assembly, the print head 106 may be configured to print content on the print media 110 by utilizing a ribbon wound on the ribbon drive assembly. In such an embodiment, the ribbon may be positioned between the print media 110 and the print head 106. To print content on the print media, the print head 106 may be configured to apply heat on a section of the ribbon and, concurrently, press the ribbon against the print media 110. Such operation (of heating the ribbon and pressing the ribbon against the print media 110) causes the ribbon to transfer the ink on the print media 110, therefore, leading to printing of the content on the print media 110.

In some examples, the scope of the disclosure is not limited to the print head 106 being a thermal print head. In an example embodiment, the print head 106 may correspond to a laser print head that may be configured to utilize Laser light to print content on the print media 110. To this end, the print head 106 may include a laser light source that may be utilized, in one implementation, to ionize an ink toner, in the printing apparatus 100, to print content on the print media 110. In another implementation, the laser light source may be configured to directly point the laser onto the print media 110 to print content on the print media 110.

Figure 2:
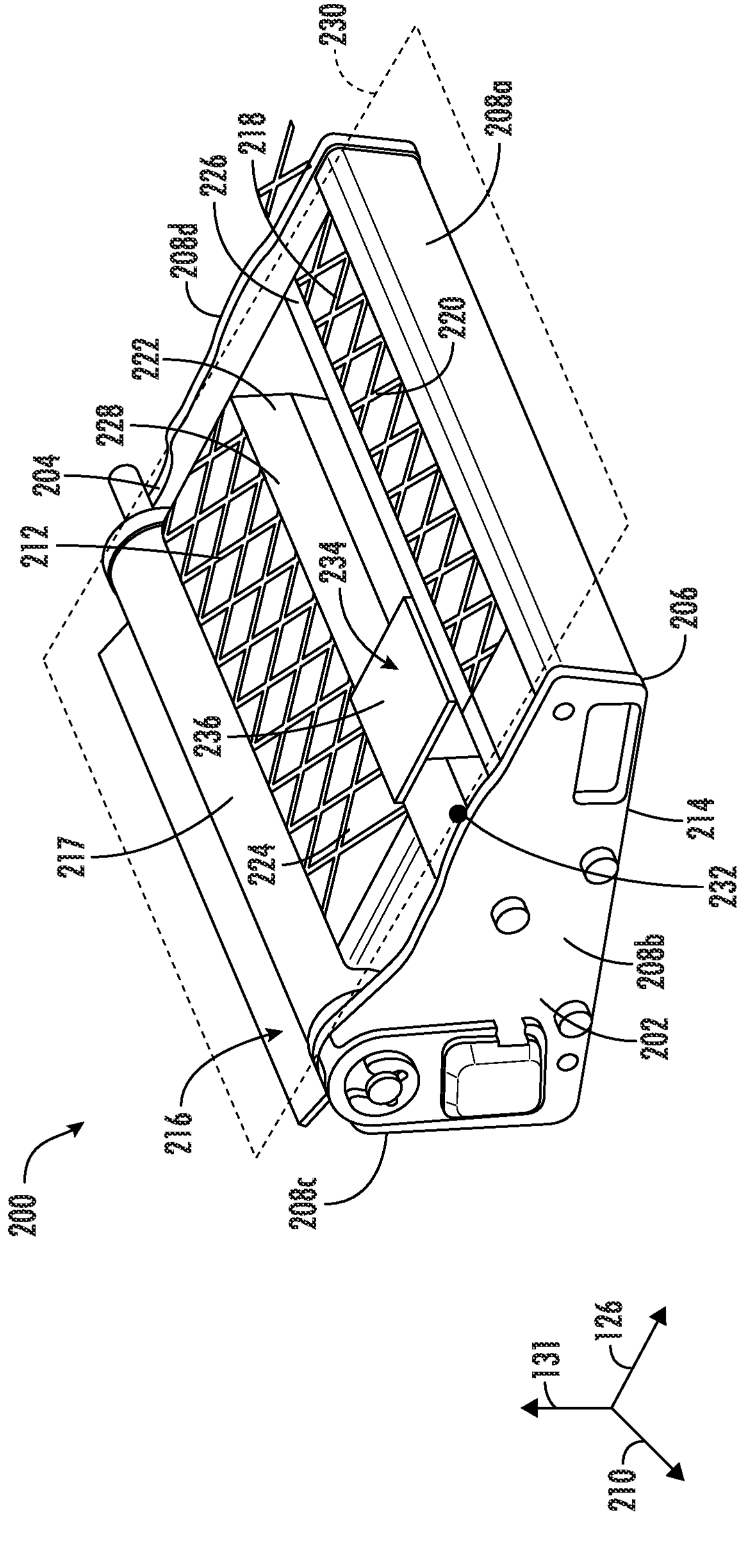
FIG. 2 illustrates a perspective view of first media guide, according to one or more embodiments described herein.

FIG. 2 illustrates a perspective view 200 of first media guide 128, according to one or more embodiments described herein.

In an example embodiment, the first media guide 128 has a surface 202 that defines a top end portion 204 and a bottom end portion 206. In some examples, the top end portion 204 and the bottom end portion 206 are spaced apart from each other along the vertical axis 131 of the printing apparatus 100. Further, the surface 202 defines one or more sides 208*a*, 208*b*, 208*c*, and 208*d* of the first media guide 128. In some examples, each of the one or more sides 208*a*, 208*b*, 208*c*, and 208*d* may extend between the bottom end portion 206 of the first media guide 128 and the top end portion 204 of the first media guide 128. In some examples, the side 208*a* may be spaced apart from the side 208*c* along the longitudinal axis 126 of the printing apparatus 100. Further, the side 208*b* may be spaced apart from the side 208*d* along a lateral axis 210 of the printing apparatus 100. In some examples, a height of the side 208*a* along the vertical axis 131 of the printing apparatus 100 may be less than a height of the side 208*c* along the vertical axis 131 of the printing apparatus 100. Accordingly, the surface 202 at the top end portion 204 of the first media guide 128 may be inclined towards the bottom end portion 206, as one traverses from the side 208*c* to the side 208*a*. Hereinafter, the surface 202 at the top end portion 204 is referred to as a top surface 212 and the surface 202 at the bottom end portion 206 is referred to as a bottom surface 214.

In an example embodiment, the top surface 212 of the first media guide 128 defines a first cavity 216 proximal to the side 208*c*. In some examples, the first cavity 216 may extend along the lateral axis 210 of the first media guide 128. In an example embodiment, the first cavity 216 may be configured to receive a first roller 217 that may facilitate traversal of the print media 110 along the media path 116. In an example embodiment, the first roller 217 may be coupled to the first electrical drive (not shown) may be actuated along with the media hub 102 to facilitate traversal of the print media 110 along the media path 116.

Additionally or alternatively, the top surface 212 of the first media guide 128 may define a first platform 218 that may extend between the side 208*a* and the first cavity 216 along the longitudinal axis 126 of the printing apparatus 100. Further, the first platform 218 may extend between the side 208*b* and the side 208*d* along the lateral axis 210 of the printing apparatus 100. In some examples, a length of the first platform 218 along the lateral axis 210 of the printing apparatus 100 may be deterministic of a maximum width of the print media 110 that the printing apparatus 100 may support. In an example embodiment, the first platform 218 may include a first planar section 220, a first media guide section 222, and a second planar section 224.

In some examples, the first planar section 220 may extend, along the longitudinal axis 126 of the printing apparatus 100, from the side 208*a* to a first junction 226 between the first planar section 220 and the first media guide section 222. Further, the first media guide section 222 may extend from the first junction 226 (between the first planar section 220 and the first media guide section 222) to a second junction 228 between the first media guide section 222 and the second planar section 224, along the longitudinal axis 126 of the printing apparatus 100. Furthermore, the second planar section 224 may extend from the second junction 228 (between the first media guide section 222 and the second planar section 224) to the first cavity 216, along the longitudinal axis 126 of the printing apparatus 100.

In an example embodiment, the first planar section 220 and the second planar section 224 may have a profile that may correspond to a flat surface. Since the top surface 212 of the first media guide 128 is inclined towards the bottom surface 214 of the first media guide 128 (along the retreat direction), therefore, the first planar section 220 is defined to be at a lower height in comparison to a height of the second planar section 224, along the vertical axis 131 of the printing apparatus 100. Additionally or alternatively, the second planar section 224 and the first planar section 220 may be coplanar. For example, a plane 230 that coincides with the top surface 212 of the first media guide 128 may pass through the second planar section 224 and the first planar section 220.

In an example embodiment, the first media guide section 222 may correspond to a protrusion that may extend along the lateral axis 210 of the printing apparatus 100. In some examples, the first media guide section 222 may have a predetermined profile. For example, the first media guide section 222 may have an arch profile, having a first radius of curvature. In an example embodiment, the first radius of curvature of the first media guide section 222 may lie in a range varying from 38 mm to 82 mm. The range is for exemplary purposes and it is understood that the range may vary in other examples and embodiments. Since the first media guide section 222 protrude out from the top surface 212 of the first media guide 128, and the since the first media guide section 222 has the arch profile, the first media guide section 222 may have a peak region 232. In an example embodiment, the peak region 232 may correspond to a region of first media guide section 222 that has a maximum height along the vertical axis 131 of the printing apparatus 100.

In some examples, the scope of the disclosure is not limited to the first media guide section 222 having the arch profile. In some examples, the first media guide section 222 may have other profiles such as, but not limited to, a rectangular profile, a conical profile, a semi-circular profile, and/or the like. For the purpose of ongoing description, the first media guide section 222 is considered to have the arch profile.

In some examples, the peak region 232 may be configured to receive a media sensor 234. In an example embodiment, the media sensor 234 may be configured to generate a signal indicative of a presence and/or location of the print media 110 in the media path 116. In some example embodiments, the media sensor 234 may be configured to detect the presence of the print media 110 by determining transmissivity and/or reflectivity of the print media 110. In an example embodiment, the transmissivity of the print media 110 may correspond to a measure of an intensity of a light signal that the print media 110 allows to pass through it. In an example embodiment, the reflectivity of the print media 110 may correspond to a measure of an intensity of light signal that is reflected from a surface of the print media 110.

In an example embodiment, the media sensor 234 includes a light transmitter and a light receiver. The light transmitter may correspond to a light source, such as a Light Emitting Diode (LED), a LASER, and/or the like. The light transmitter may be configured to direct the light signal on the media path 116.

The light receiver may correspond to at least one of a photodetector, a photodiode, or a photo resistor. The light receiver may generate a signal based on an intensity of the light signal received by the light receiver. In an example embodiment, the signal may correspond to a voltage signal, where one or more characteristics of the voltage signal, such as the amplitude of the voltage signal and frequency of the voltage signal, are directly proportional to the intensity of the portion of the light signal received by the light receiver.

In operation, the light transmitter of the media sensor 234 may be configured to direct the light signal on the media path 116. If the print media 110 is present on the media path 116, a portion of light signal may be reflected from the surface of the print media 110. To detect the portion of the light signal reflected from the surface of the print media 110, the light receiver and the light transmitter may be, in some examples, positioned in a same plane or on a same side of the media path 116. Accordingly, in some implementations, where the print media 110 is not present on the media path 116, the light receiver may not receive the portion of the light signal (transmitted by the light transmitter), and therefore may not generate the signal. Therefore, based on the signal generated by the media sensor 234, the presence of the print media 110 on the media path 116 may be determined. To this end, the presence of the print media 110 is determined based on the reflectivity of the print media 110.

In another example, the light receiver and light transmitter may be positioned opposite to each other across the media path 116, without departing from the scope of the disclosure. In such an embodiment, the light receiver may receive the portion of the light signal that passes through the print media 110, and based on the intensity of the portion of the received light signal, the light receiver generates the signal. Therefore, the media sensor 234 may determine the presence of the print media 110 on the media path 116 based on the transmissivity of the print media 110.

For the purpose of ongoing description, the media sensor 234 is considered to generate the signal (indicative of the presence and location of the print media 110) based on the transmissivity of the print media 110. To this end, the media sensor 234 may include a light transmitter 236 and a light receiver (refer FIG. 3). Further, the peak region 232 may receive the light transmitter 236. In an alternative embodiment, the peak region 232 may receive the light receiver (refer FIG. 3). The light transmitter 236 has been interchangeably referred to as a first media sensor 234 and the light receiver has been interchangeably referred to as a second media sensor.

Figure 3:
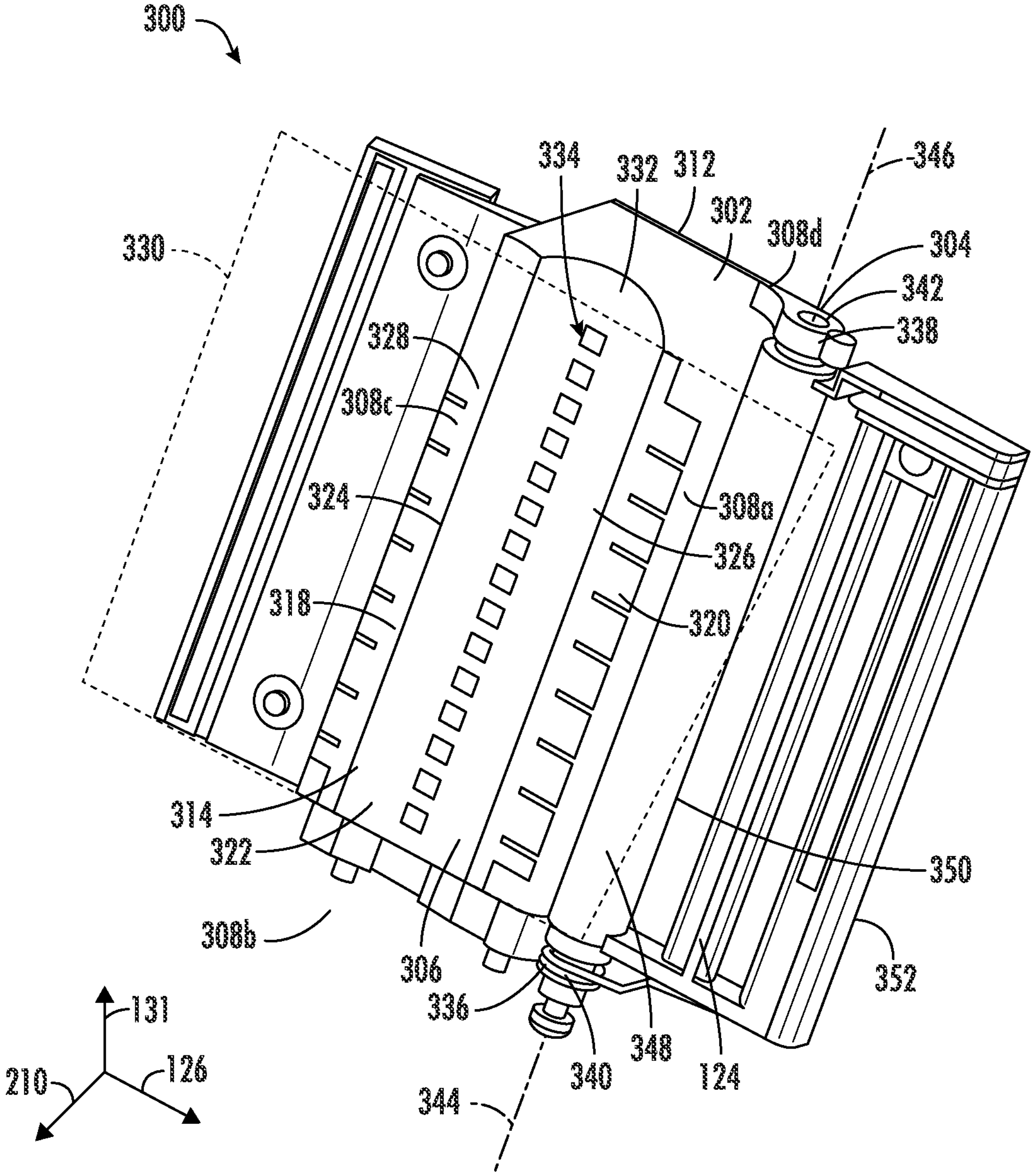
FIG. 3 illustrates a bottom perspective view of the second media guide, according to one or more embodiments described herein.

FIG. 3 illustrates a bottom perspective view 300 of the second media guide 130, according to one or more embodiments described herein.

In an example embodiment, the second media guide 130 has a surface 302 that defines a top end portion 304 and a bottom end portion 306. Further, the surface 302 defines one or more sides **308*a*, 308*b*, 308*c*, and 308*d* of the second media guide 130. In some examples, each of the one or more sides 308*a*, 308*b*, 308*c*, and 308*d* may extend between the bottom end portion 306 of the second media guide 130 and the top end portion 304 of the second media guide 130. In some examples, the side 308*a* may be spaced apart from the side 308*c* along the longitudinal axis 126 of the printing apparatus 100. Further, the side 308*b* may be spaced apart from the side 308*d* along the lateral axis 210 of the printing apparatus 100**.

Hereinafter, the surface 302 at the top end portion 304 is referred to as a top surface 312 and the surface 302 at the bottom end portion 306 is referred to as a bottom surface 314. In an example embodiment, the bottom surface 314 of the second media guide 130 may define a second platform 318 that may extend between the side **308*a* and the side 308*c* along the longitudinal axis 126 of the printing apparatus 100. Further, the second platform 318 may extend between the side 308*b* and 308*d* along the lateral axis 210 of the printing apparatus 100. In some examples, a length of the second platform 318 along the lateral axis 210 of the printing apparatus 100 may be deterministic of the maximum width of the print media 110 that the printing apparatus 100 may support. In an example embodiment, the length of the second platform 318 along the lateral axis 210 of the printing apparatus 100 may equal to the length of the first platform 218 (defined by the top surface 212 of the first media guide 128) along the lateral axis 210 of the printing apparatus 100**.

In an example embodiment, the second platform 318 may include a third planar section 320, a second media guide section 322, and a fourth planar section 324. In some examples, the third planar section 320 may extend, along the longitudinal axis 126 of the printing apparatus 100, from the side **308*a* to a third junction 326 between the third planar section 320 and the second media guide section 322. Further, the second media guide section 322 may extend from the third junction 326 (between the third planar section 320 and the second media guide section 322) to a fourth junction 328 between the second media guide section 322 and the second planar section 224. Furthermore, the fourth planar section 324 may extend from the fourth junction 328 (between the second media guide section 322 and the fourth planar section 324) to the side 308*c*. In an example embodiment, the third planar section 320 and the fourth planar section 324 may have a profile that may correspond to flat surface. Additionally or alternatively, the fourth planar section 324 and the third planar section 320 may be coplanar. For example, a plane 330 that coincides with the bottom surface 314 of the second media guide 130 may pass through the fourth planar section 324 and the third planar section 320**.

In an example embodiment, the second media guide section 322 may correspond to a recess that may extend along the lateral axis 210 of the printing apparatus 100. In some examples, the second media guide section 322 may have an arch profile having a second radius of curvature. In some examples, the second radius of curvature of the second media guide section 322 may be greater than the first radius of curvature of the first media guide section 222. Further, the second radius of curvature may lie in a range from 40 mm to 84 mm. The range is for exemplary purposes and it is understood that the range may vary in other examples and embodiments.

In some examples, the scope of the disclosure is not limited to the second media guide section 322 having the arch profile. In some examples, the second media guide section 322 may have other profiles such as, but not limited to, a rectangular profile, a conical profile, a semi-circular profile, and/or the like. For the purpose of ongoing description, the second media guide section 322 is considered to have the arch profile.

Since the second media guide section 322 corresponds to a recess, the second media guide section 322 may have a valley region 332. In an example embodiment, the valley region 332 may correspond to a deepest region in the second media guide section 322, along the vertical axis 131 of the printing apparatus 100. In some examples, the valley region 332 may be configured to receive the media sensor 234. More particularly, the valley region 332 of the second media guide section 322 may be configured to receive the light receiver 334.

In an example embodiment, the surface 302 of the second media guide 130 may be configured to define a first flange region 336 and a second flange region 338 on the side 308*a*. In an example embodiment, the first flange region 336 and the second flange region 338 may be spaced apart from each other along the lateral axis 210 of the printing apparatus 100. In some examples, the first flange region 336 and the second flange region 338 may be defined proximal to the side 308*b* and the side 308*d*, respectively. Additionally or alternately, the first flange region 336 and the second flange region 338 may define a first through hole 340 and a second through hole 342, respectively. In some examples, the first through hole 340 and the second through hole 342 may have a first central axis 344 and a second central axis 346, respectively. Further, the first central axis 344 and the second central axis 346 may be parallel to the lateral axis 210 of the printing apparatus 100. In some examples, the first central axis 344 and the second central axis 346 may be coincidental.

In an example embodiment, the first through hole 340 and the second through hole 342 may be configured to receive a rotatable shaft 348. The rotatable shaft 348 may be configured to be coupled to the media guide extension portion 124. Since the rotatable shaft 348 is rotatable with respect to the second media guide 130, accordingly, the media guide extension portion 124 is also rotatable with respect to the second media guide 130. The rotatability of the media guide extension portion 124 may allow adjusting of an orientation of the media guide extension portion 124 with respect to the second media guide 130. In some examples, the rotatable shaft 348 may be further coupled to a fastening means (not shown) that may be configured to thwart the rotatability of the rotatable shaft 348. Therefore, using the fastening means (not shown), the orientation of the media guide extension portion 124 with respect to the second media guide 130, may be adjusted.

In an example embodiment, the media guide extension portion 124 may have a first end 350 and a second end 352. The first end 350 may of the media guide extension portion 124 may be coupled to the rotatable shaft 348 and the second end 352 may be spaced apart from the first end 350 along the longitudinal axis 126 of the printing apparatus 100. In some examples, a length of the media guide extension portion 124 along the lateral axis 210 of the printing apparatus 100 may equivalent to the length of the second platform 318 along the lateral axis 210 of the printing apparatus 100.

In some examples, the scope of the disclosure is not limited to the media guide extension portion 124 being rotatably coupled with the second media guide 130. In an example embodiment, the media guide extension portion 124 may be fixedly coupled to the second media guide 130. In such an embodiment, the media guide extension portion 124 may correspond to an extension protruding out from the second media guide 130 along the longitudinal axis 126 of the printing apparatus 100. As discussed above, the printing apparatus 100 may include the platen roller 120 instead of the media guide extension portion 124. In such embodiment, the platen roller 120 may be positioned at a position where the second end 352 of the media guide extension portion 124 would have been. In some examples, the printing apparatus 100 may include both the platen roller 120 and the media guide extension portion 124. In such an embodiment, the second end 352 of the media guide extension portion 124 may be configured to receive the platen roller 120, without departing from the scope of the disclosure.

In an example embodiment, the second media guide 130 is configured to be disposed at a predetermined distance the top of the first media guide 128, along the vertical axis 131 of the printing apparatus 100, to assemble the media guide assembly 122. The structure of the assembled media guide assembly 122 is further described in FIG. 4.

Figure 4:
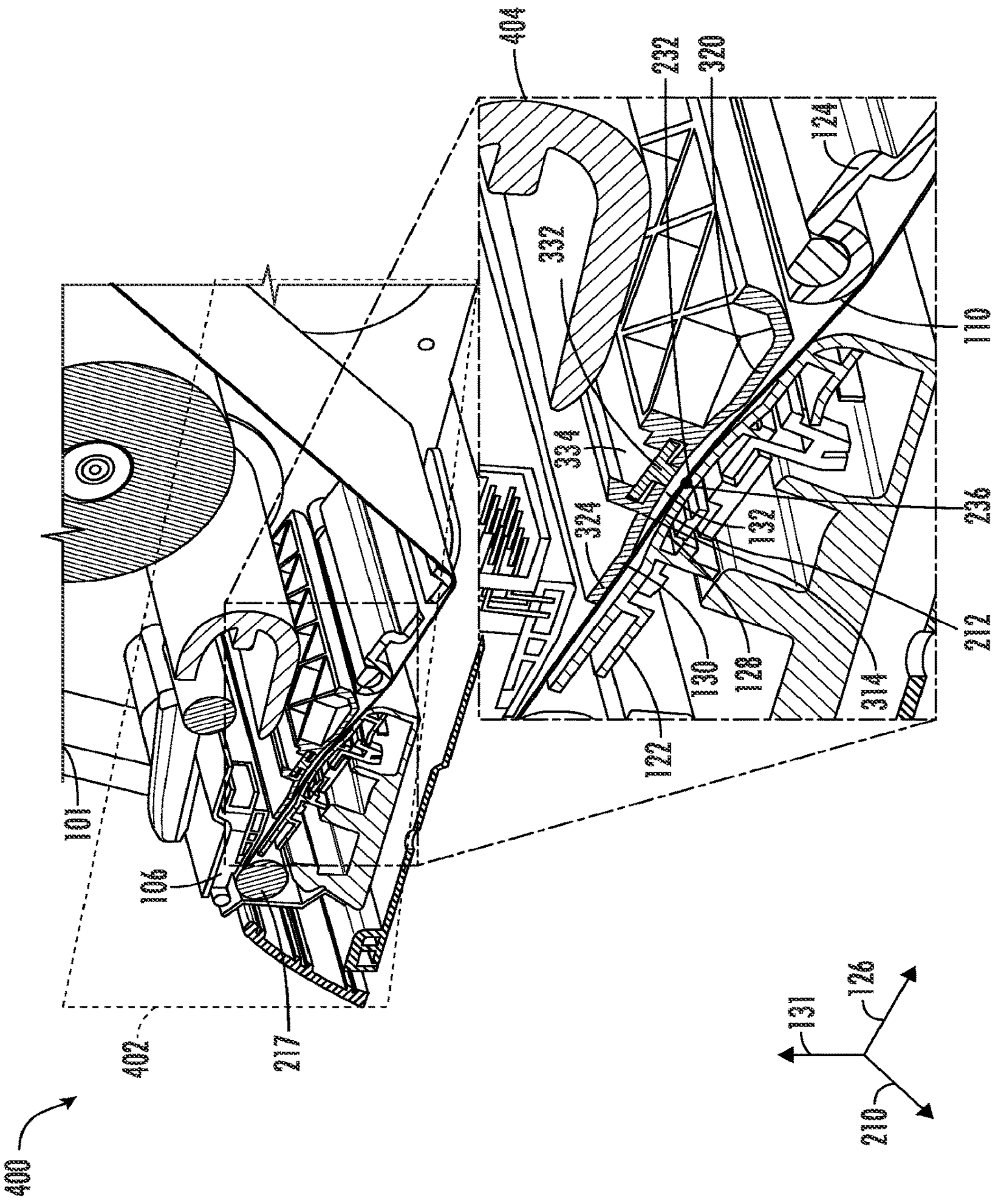
FIG. 4 illustrates a perspective sectional view of the printing apparatus, according to one or more embodiments described herein.

FIG. 4 illustrates a perspective sectional view 400 of the printing apparatus 100, according to one or more embodiments described herein. In some examples, the sectional view 400 is created when a plane 402 cuts the printing apparatus 100. FIG. 4 further illustrates a zoomed perspective view 404 of the media guide assembly 122, according to one or more embodiments described herein.

As depicted in FIG. 4, the first media guide 128 and the second media guide 130 are coupled to the back spine 101 of the printing apparatus 100. Further, the second media guide 130 is disposed at the predetermined distance from the first media guide 128 (along the vertical axis 131 of the printing apparatus 100) in such a manner that the bottom surface 314 of the second media guide 130 is parallel to the top surface 212 of the first media guide 128. To this end, the first media guide 128 is positioned at the predetermined distance (e.g., approximately 2 mm) from the second media guide 130. Accordingly, the gap 132 is defined between the first media guide 128 and the second media guide 130. The gap 132 may extend along the length (along the longitudinal axis 126 of printing apparatus 100) and the breadth (along the lateral axis 210 of the printing apparatus 100) of the media guide assembly 122. In an example embodiment, the gap 132 may define a section of the media path 116 through which the print media 110 traverses. In an example embodiment, the gap 132 may be deterministic based on a maximum thickness of the print media 110 to be supported by the printing apparatus 100.

In an example embodiment, when the second media guide 130 is disposed at the predetermined distance from the first media guide 128 (along the vertical axis 131 of the printing apparatus 100), the peak region 232 (defined by the top surface 212 of the first media guide 128) is received within the valley region 332 (defined by the bottom surface 314 of the second media guide 130). In some examples, the gap 132 between the first media guide 128 and the second media guide 130 may deterministic a portion of the peak region 232 that is received within with the valley region 332. In some examples, the gap 132 so determined that when the second media guide 130 is disposed at the predetermined distance from the first media guide 128, the peak region 232 (defined on the first media guide 128) is positioned above the third planar section 320 and the fourth planar section 324 (defined on the second platform 318), along the vertical axis 131 of the printing apparatus 100.

As discussed above, the light transmitter 236 (of the media sensor 234) is disposed on the peak region 232 of the first media guide 128 and the light receiver 334 (of the media sensor 234) is disposed in the valley region 332. Accordingly, when the peak region 232 is received in the valley region 332, the light transmitter 236 (positioned on the peak region 232) of the media sensor 234 gets aligned with the light receiver 334 (positioned in the valley region 332) of the media sensor 234.

In an example embodiment, as depicted in FIG. 4, the print head 106 is positioned on top of the first roller 217. In an example embodiment, the print head 106 may abut the first roller 217. In alternative embodiment, the print head 106 may be positioned at another predetermined distance from the first roller 217, along the vertical axis 131 of the printing apparatus 100.

As discussed above, the top surface 212 of the first media guide 128 is inclined towards the bottom surface 214 of the first media guide 128. Further, as discussed above, the second media guide 130 is parallel to the top surface 212 of the first media guide 128. Accordingly, the second media guide 130 is also inclined towards to the bottom surface 214 of the first media guide 128. To this end, the media guide extension portion 124 is also inclined towards the bottom surface 214 of the first media guide 128. Accordingly, referring FIG. 1*b* and FIG. 4 to traverse the print media 110 in the print direction (i.e., from media supply spool 108 to the print head 106), the print media 110 may initially traverse in a downward direction, along the vertical axis 131 of the printing apparatus 100, towards the media guide extension portion 124. Thereafter, the media guide extension portion 124 may facilitate a change in a direction of the print media 110 traversal. For example, the media guide extension portion 124 may cause the print media 110 to change in the direction of the print media 110 traversal and travel up the inclination of the first media guide 128 (i.e., from the side 208*a* of the first media guide 128 to the first roller 217). More particularly, the print media 110 may traverse through the gap 132 formed between the first media guide 128 and the second media guide 130. In some examples, the profiles of the first media guide section 222 and the second media guide section 322 may enable the print media 110 to be in contact with the media sensor 234 during the traversal of the print media 110 along the media path 116. For example, the first media guide section 222 and the second media guide section 322 may enable the print media 110 to be in contact with the light transmitter 236 of the media sensor 234 (positioned on the peak region 232) during the traversal of the print media 110 along the media path 116. The traversal of the print media 110 along the media path 116 is further described in FIGS. 5-11.

Figure 5:
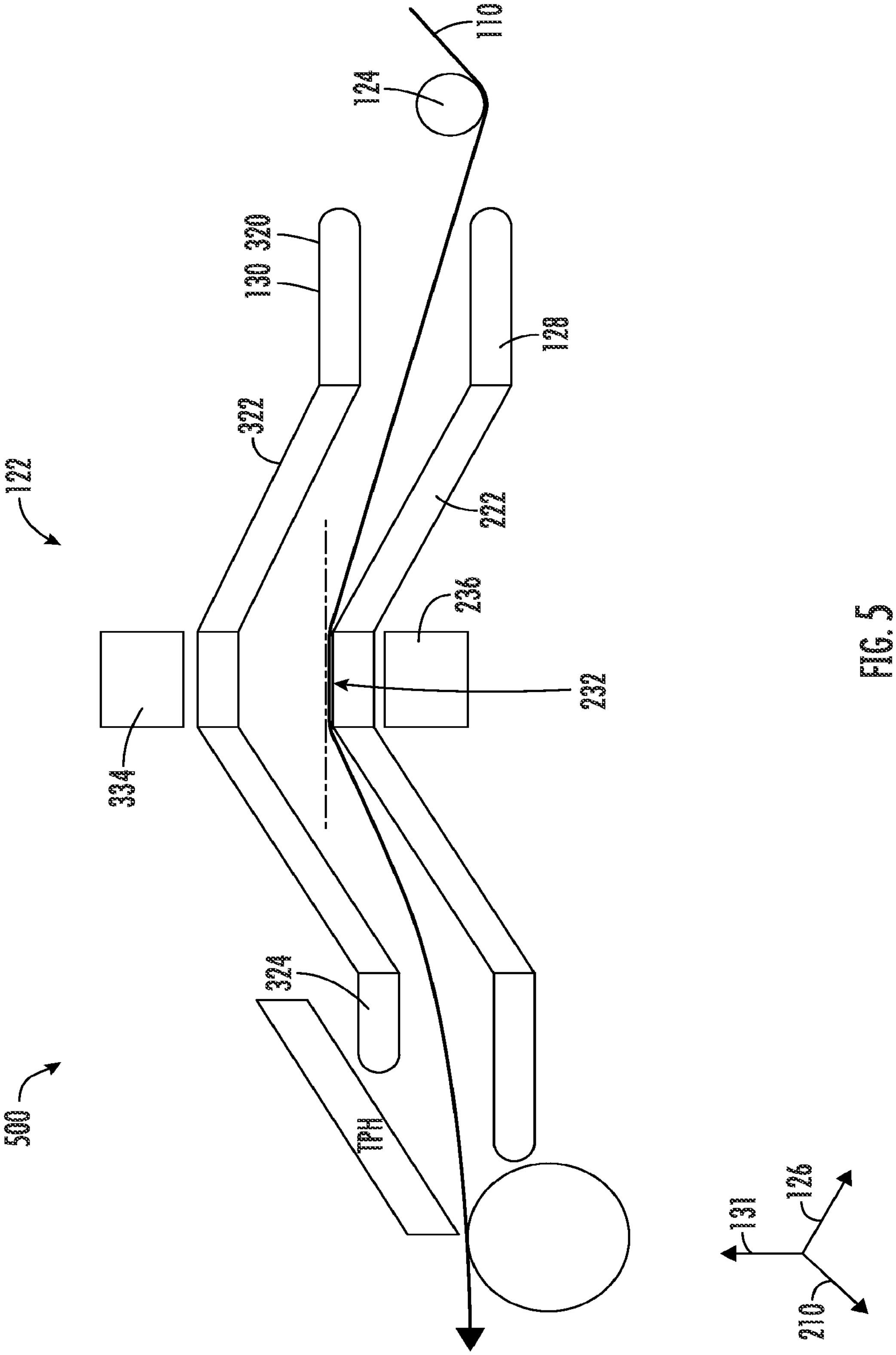
FIG. 5 illustrates a schematic diagram of the media guide assembly depicting traversal of the print media along the media path, according to one or more embodiments described herein.

FIG. 5 illustrates a schematic diagram 500 of the media guide assembly 122 depicting traversal of the print media 110 along the media path 116, according to one or more embodiments described herein.

The schematic diagram 500 illustrates the first media guide 128 and the second media guide 130. Further, the schematic diagram 500 illustrates that the media guide extension portion 124 is positioned upstream of the second media guide 130. It can be observed that the media guide extension portion 124 changes the direction of the traversal of the print media 110 causing the print media 110 to traverse through the media guide assembly 122.

Further, as depicted in FIG. 5, the print media 110 is in contact with the light transmitter 236 disposed on the peak region 232 of the first media guide section 222. Since the peak region 232 is positioned above the third planar section 320 and the fourth planar section 324 (defined on the second media guide 130), the print media 110 remains in contact with the peak region 232 of the first media guide 128. Accordingly, the print media 110 remains in contact with the light transmitter 236 of the media sensor 234 (disposed on the peak region 232).

In some examples, the scope of the disclosure is not limited to the third planar section 320 and the fourth planar section 324 being positioned below the peak region 232 along the vertical axis 131 of the printing apparatus 100. In an example embodiment, the plane 330 (passing through third planar section 320 and the fourth planar section 324) may be at a negative offset from a plane 321 passing through the peak region 232 of the first media guide section 222. In an example embodiment, the negative offset corresponds to a displacement between two planes in a direction opposite to a normal extending out from the material through which the two planes pass. For example, the plane 321 is positioned in a direction opposite to a normal extending out from the third planar section 320 and the fourth planar section 324.

In some examples, the scope of the disclosure is not limited to the third planar section 320 and the fourth planar section 324 being positioned at the negative offset from the plane 321. In an example embodiment, the extremities of the first media guide 128 may be positioned at the negative offset plane 321. In an example embodiment, the extremities of the first media guide 128 may correspond to the ends of the first media guide 128. In another example, the first planar section 220 and the second planar section 224 may correspond to the extremities of the first media guide 128.

In some examples, the first planar section 220 and the second planar section 224 may not be planar and may be curved or may have any other shape without departing from the scope of the disclosure.

Figure 6:
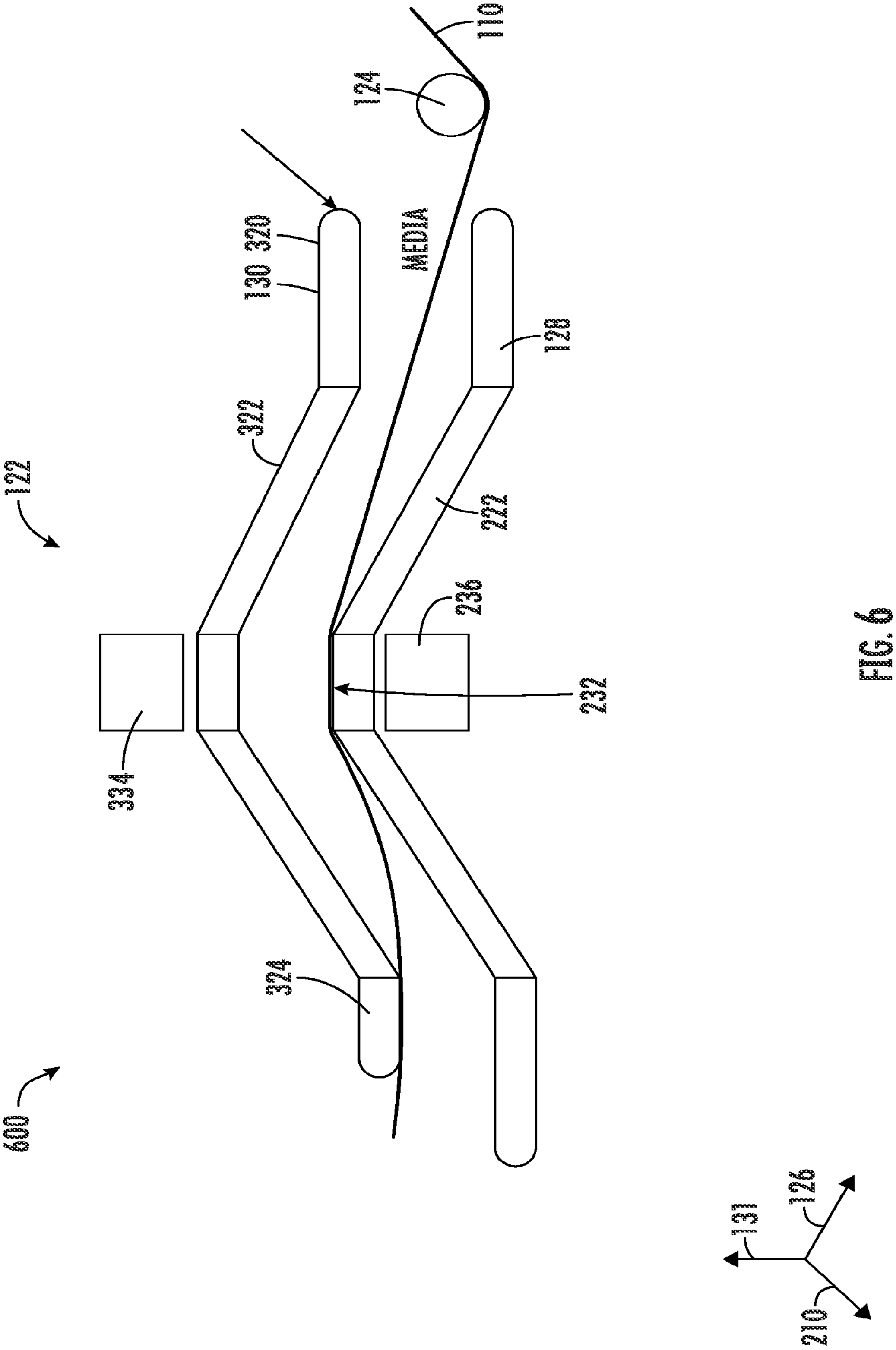
FIG. 6 illustrates another schematic diagram of the media guide assembly depicting traversal of the print media along the media path, according to one or more embodiments described herein.
Figure 7:
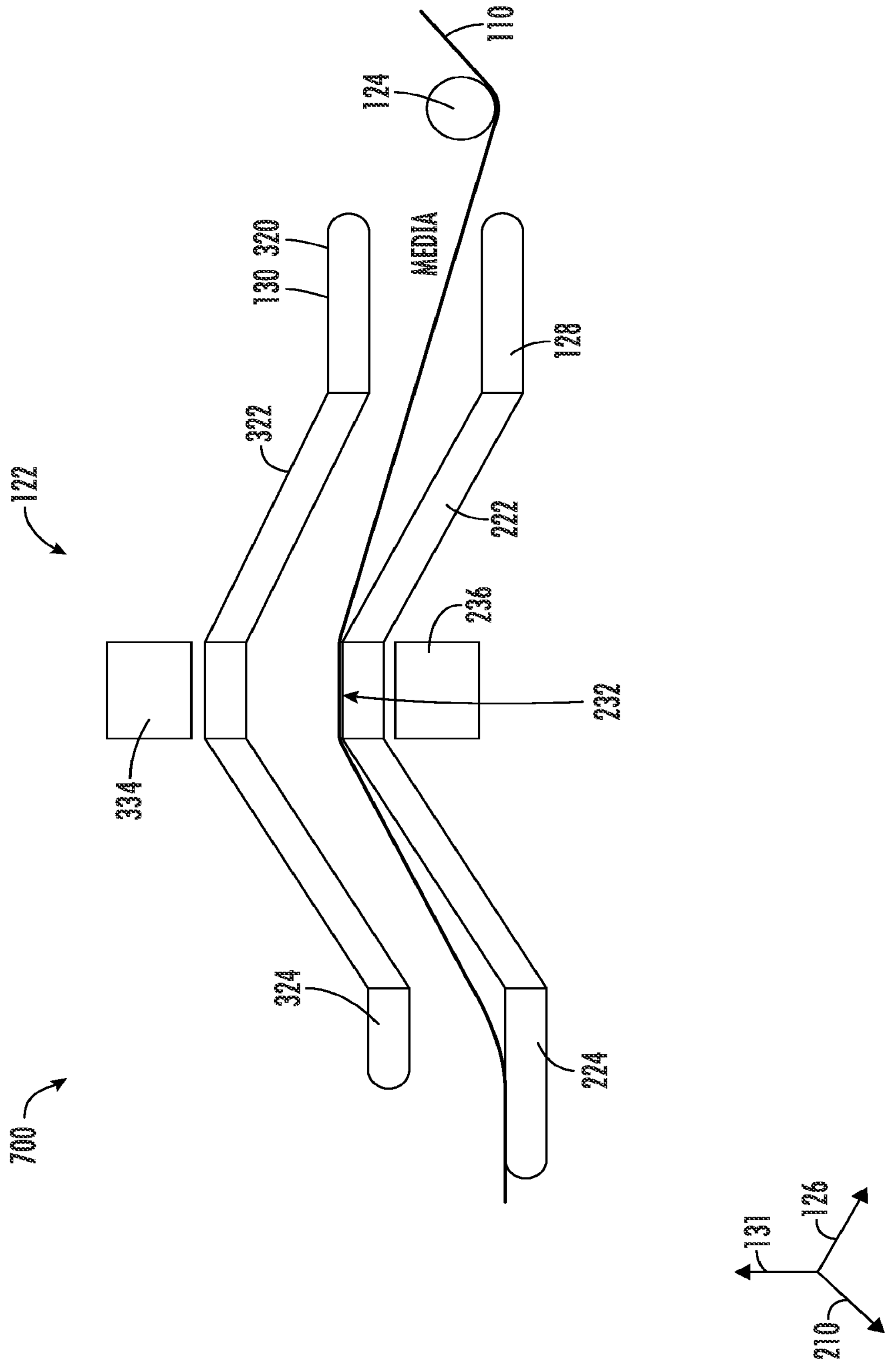
FIG. 7 illustrates another schematic diagram of the media guide assembly depicting traversal of the print media along the media path, according to one or more embodiments described herein.
Figure 8:
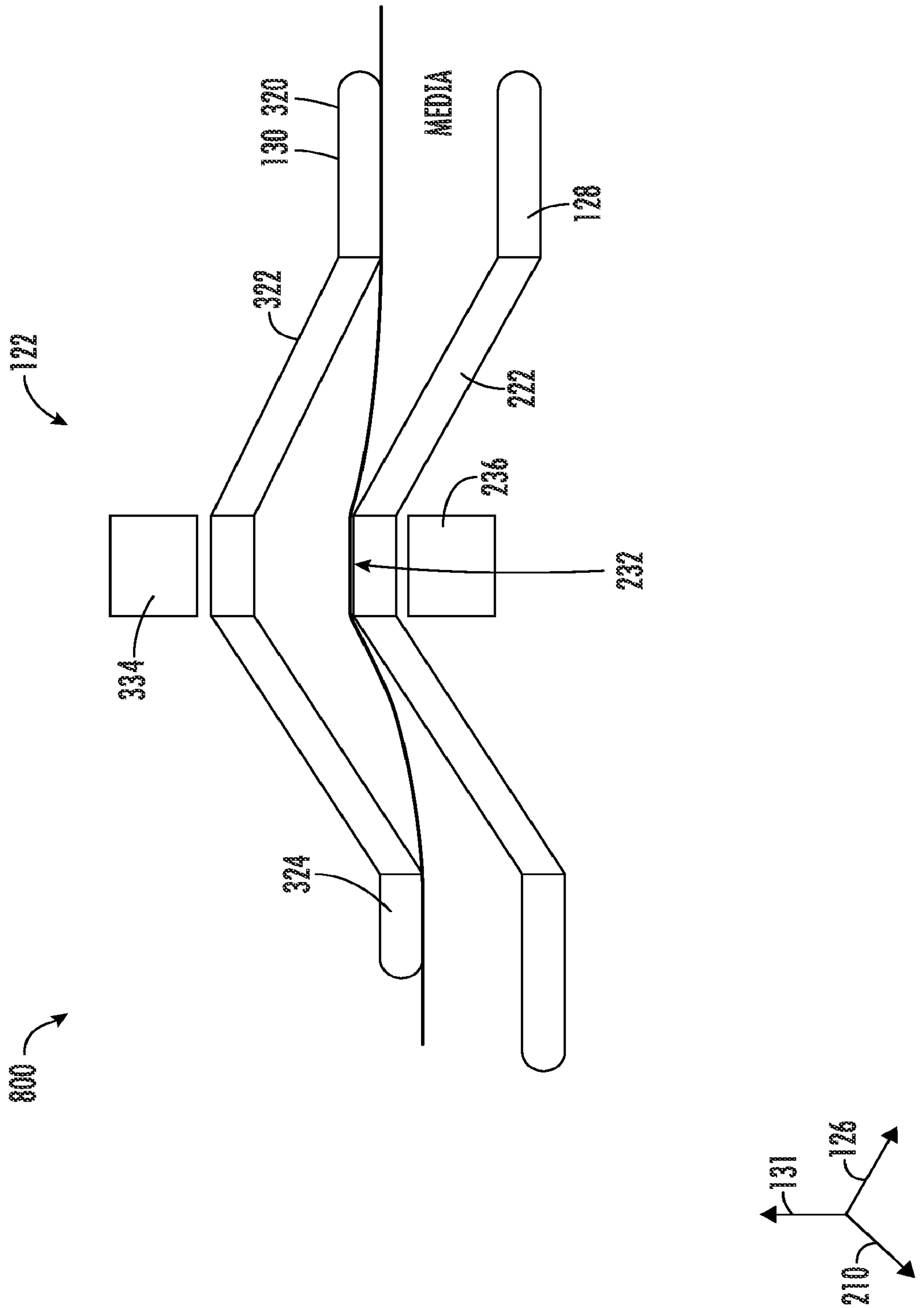
FIG. 8 illustrates another schematic diagram of the media guide assembly depicting the traversal of the print media along the media path, according to one or more embodiments described herein.

In some scenarios, during the traversal of the print media 110 along the media path 116, slackness may be observed in the print media 110. In such scenarios, the media guide assembly 122 ensures that the slackness in the print media 110 does not affect the contact between the print media 110 and the media sensor 234. FIGS. 6, 7, and 8 illustrate such scenarios.

In some examples, the scope of the disclosure is not limited to the first media guide 128 and the second media guide 130 positioned along the vertical axis 131. In an example embodiment, the first media guide 128 and the second media guide 130 may be positioned along the lateral axis 210 of the printing apparatus 100, without departing from the scope of the disclosure. For brevity, the forgoing description has been described considering that the first media guide 128 and the second media guide 130 are positioned along the vertical axis 131

FIG. 6 illustrates another schematic diagram 600 of the media guide assembly 122 depicting traversal of the print media 110 along the media path 116, according to one or more embodiments described herein.

As depicted in the schematic diagram 600, due to the slackness in the print media 110 during traversal, the print media 110 is in contact with the fourth planar section 324 of the second platform 318. Since, as discussed above, the fourth planar section 324 is positioned below the peak region 232 defined on the first media guide 128, therefore, the fourth planar section 324 ensures that the print media 110 remains in the contact with the media sensor 234 (e.g., the light transmitter 236 of the media sensor 234). Additionally or alternatively, since the media guide extension portion 124 is also positioned below the peak region 232 along the vertical axis 131 of the printing apparatus 100, therefore, the media guide extension portion 124 may also facilitate the print media 110 to be contact with the media sensor 234 irrespective of the slackness in the print media 110 downstream of the media guide assembly 122.

FIG. 7 illustrates another schematic diagram 700 of the media guide assembly 122 depicting traversal of the print media 110 along the media path 116, according to one or more embodiments described herein.

As depicted in the schematic diagram 700, due the slackness in the print media 110 during traversal, the print media 110 is in contact with the second planar section 224 of the first platform 218. As discussed above, the second planar section 224 is positioned below the peak region 232 defined on the first media guide 128. Further, the media guide extension portion 124 is also positioned below the peak region 232 along the vertical axis 131 of the printing apparatus 100. Therefore, the second planar section 224 and the media guide extension portion 124 ensure that the print media 110 remains in the contact with the media sensor 234 (e.g., the light transmitter 236 of the media sensor 234).

FIG. 8 illustrates another schematic diagram 800 of the media guide assembly 122 depicting the traversal of the print media 110 along the media path 116, according to one or more embodiments described herein.

As depicted in the schematic diagram 800, due to slackness in the print media 110 during traversal, the print media 110 is in contact with the third planar section 320 and the fourth planar section 324 of the second platform 318 (defined on the second media guide 130). Since both the third planar section 320 and the fourth planar section 324 are positioned lower than the peak region 232 (defined on the first media guide 128). Accordingly, the third planar section 320 and the fourth planar section 324 ensures that the print media 110 remains in contact with the media sensor 234 during traversal of the print media 110 along the media path 116.

Figure 9:
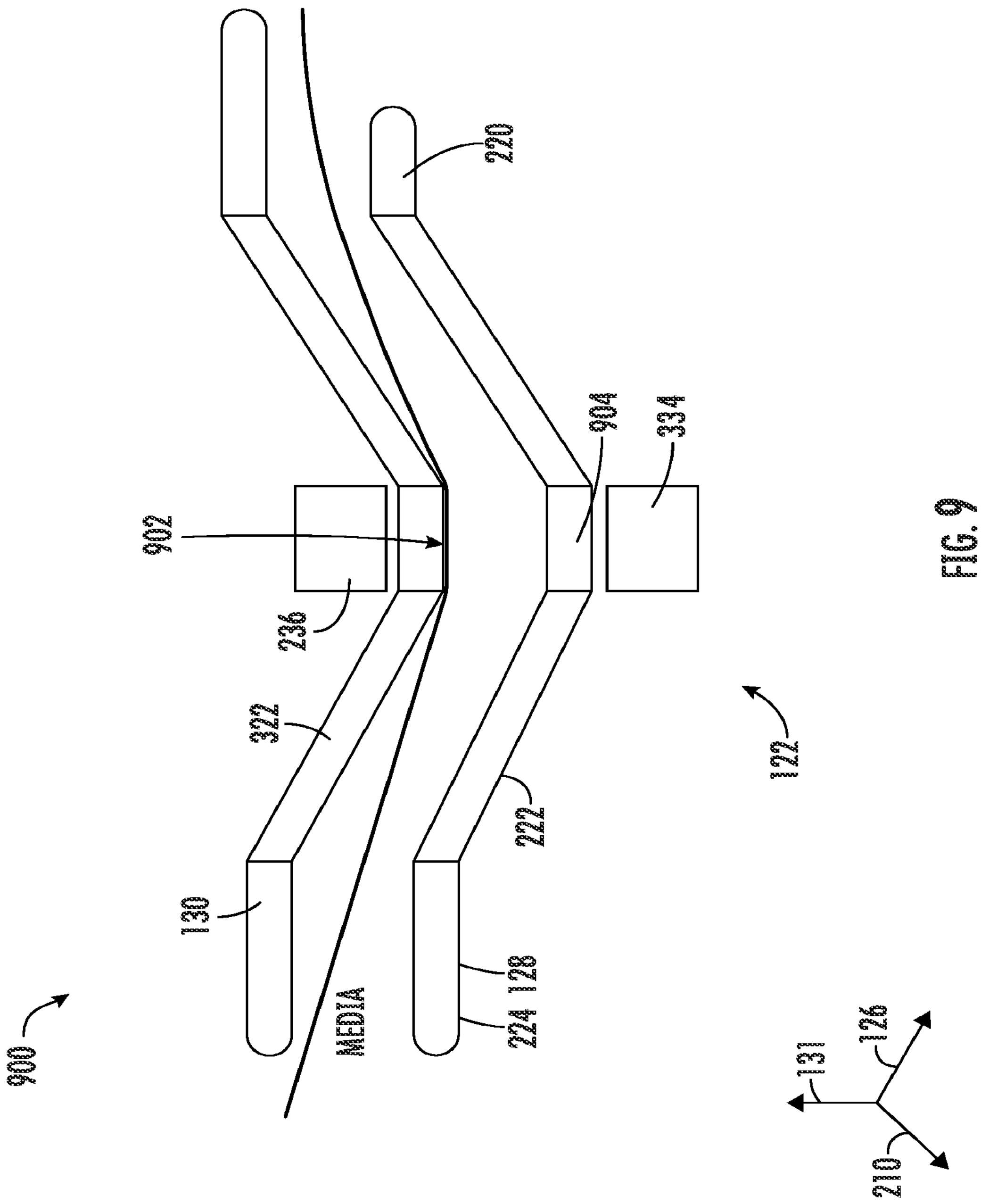
FIG. 9 illustrates another schematic diagram of the media guide assembly, according to one or more embodiments described herein.

In some examples, the scope of the disclosure is not limited to the peak region 232 defined on the first media guide 128. In some examples, the peak region 232 may be defined on the second media guide 130. To this end, the valley region 332 may defined on the first media guide 128, without departing from the scope of the disclosure. FIG. 9 illustrates such an implementation of the media guide assembly 122.

FIG. 9 illustrates another schematic diagram of the media guide assembly 122, according to one or more embodiments described herein. As depicted in the schematic diagram 900, a peak region 902 is defined on the second media guide 130 and a valley region 904 is defined on the first media guide 128. In some examples, the positioning of the light transmitter 236 and the light receiver 334, of the media sensor 234, may remain unchanged. In alternate embodiment, the positioning of the light transmitter 236 and the light receiver 334, of the media sensor 234, may be reversed. Accordingly, to this end, the light receiver 334 may be positioned on the peak region 902 and the light transmitter may be positioned within the valley region 904, without departing from the scope of the disclosure.

Figure 10:
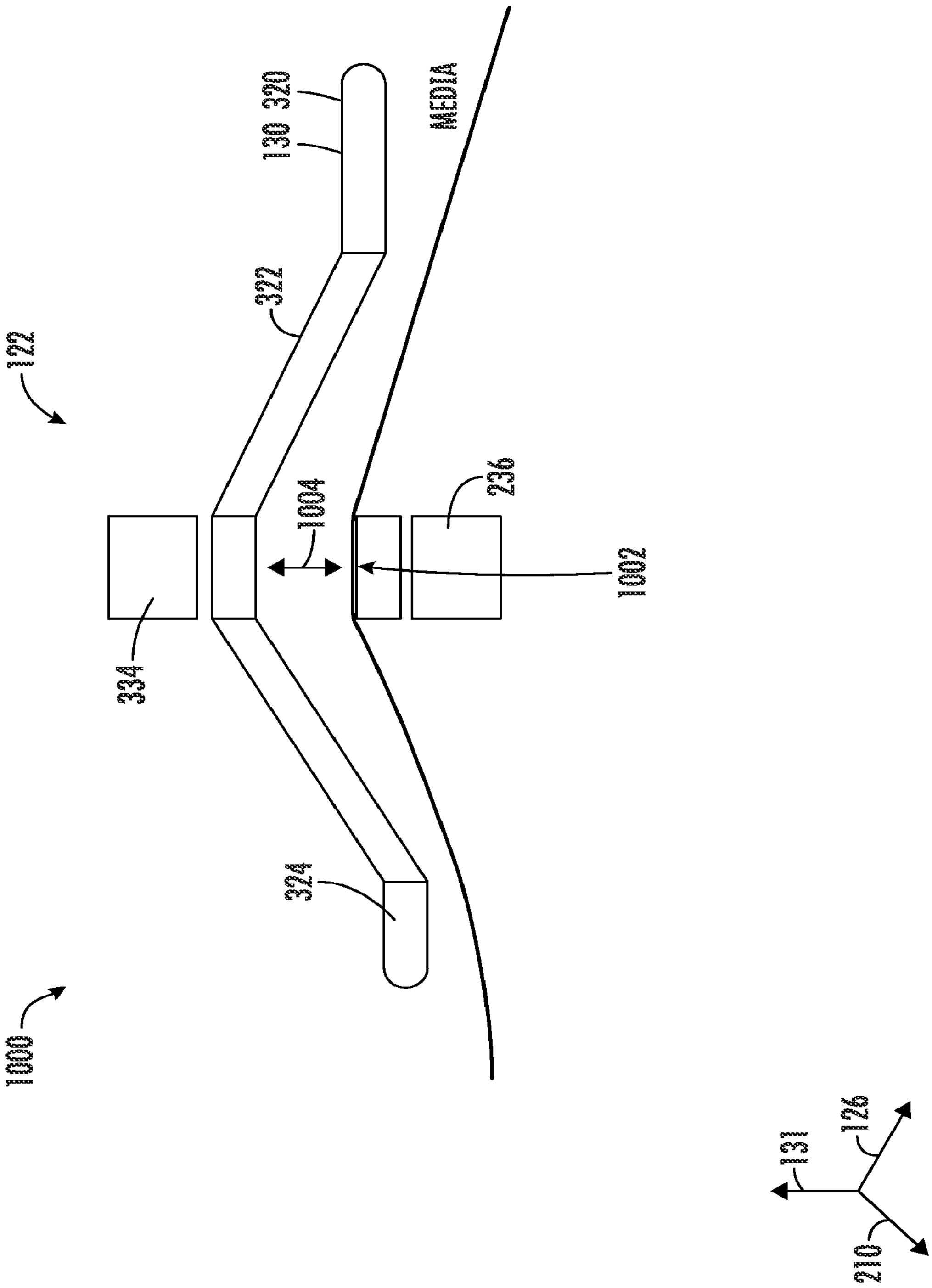
FIG. 10 illustrates another schematic diagram of the media guide assembly, according to one or more embodiments described herein.

In some examples, the scope of the disclosure is not limited to the media guide assembly 122 having both the first media guide 128 and the second media guide 130. In an example embodiment, the media guide assembly 122 may only include the second media guide 130 that has the valley region 332. In such an embodiment, the printing apparatus 100 may include a shaft coupled to the back spine 101 of the printing apparatus 100 and may extend out from the back spine 101 of the printing apparatus 100 along the lateral axis 210 of the printing apparatus 100. The shaft may be positioned within the valley region 332 and may be further configured to receive the light transmitter 236 of the media sensor 234. FIG. 10 illustrates such an implementation of the media guide assembly 122.

FIG. 10 illustrates another schematic diagram 1000 of the media guide assembly 122, according to one or more embodiments described herein.

From the schematic diagram 1000, it can be observed that the third planar section 320 and the fourth planar section 324 may positioned below the shaft 1002 along the vertical axis 131 of the printing apparatus 100. Further, it can be observed from the schematic diagram 1000 that the print media 110 traverses through a gap 1004 between the shaft 1002 and the second media guide 130. Accordingly, the third planar section 320 and the fourth planar section 324 may ensure that print media 110 remain in contact with the shaft 1002 irrespective of any slackness in the print media 110 during traversal of the print media 110 along the media path 116.

Similarly, the media guide assembly 122 may only include the first media guide 128 having the valley region 904. In such an example, the printing apparatus 100 may include the shaft coupled to the back spine 101 of the printing apparatus 100 and may extend out from the back spine 101 of the printing apparatus 100 along the lateral axis 210 of the printing apparatus 100. The shaft may be positioned within the valley region 904 of the first media guide 128.

Figure 11:
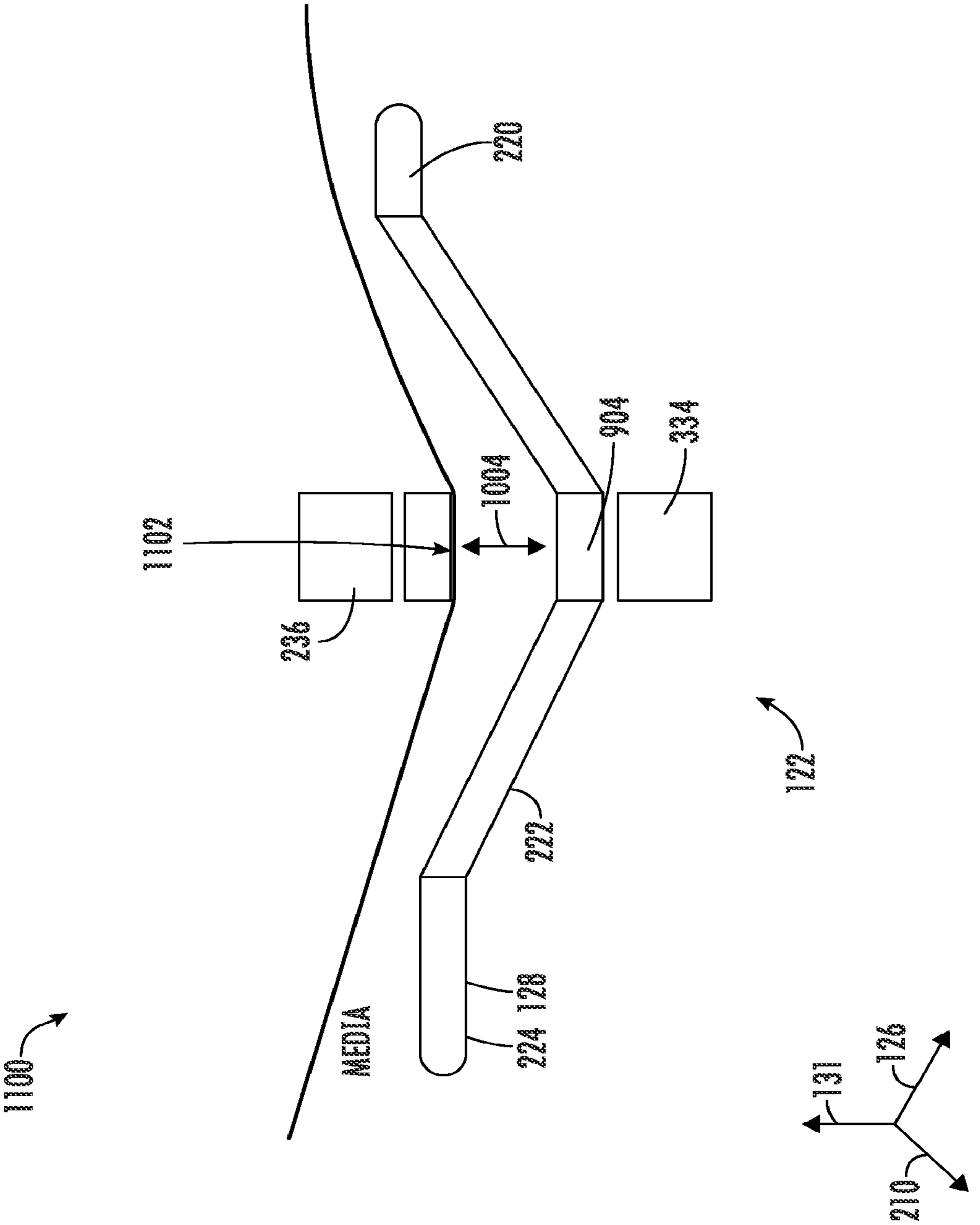
FIG. 11 illustrates another schematic diagram of the media guide assembly, according to one or more embodiments described herein.

FIG. 11 illustrates another schematic diagram 1100 of the media guide assembly 122, according to one or more embodiments described herein.

From the schematic diagram 1100, it can be observed that the first planar section 220 and the second planar section 224 may positioned above the shaft 1102 along the vertical axis 131 of the printing apparatus 100. Further, it can be observed that the print media 110 traverses through the gap 1104 between the valley region 904 and the shaft 1102. Accordingly, the first planar section 220 and the second planar section 224 may ensure that print media 110 remain in contact with the shaft 1102 irrespective of any slackness in the print media 110 during traversal of the print media 110 along the media path 116.

In the specification and figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary, and examples. Insofar as such block diagrams, flow charts, schematics, and examples contain one or more functions and/or operations, each function and/or operation within such block diagrams, flowcharts, schematics, or examples can be implemented, individually and/or collectively, by a wide range of hardware thereof.

In one embodiment, examples of the present disclosure may be implemented via Application Specific Integrated Circuits (ASICs). However, the embodiments disclosed herein, in whole or in part, can be equivalently implemented in standard integrated circuits, as one or more computer programs running on one or more computers (e.g., as one or more programs running on one or more computer systems), as one or more programs running on one or more processing circuitries (e.g., micro-processing circuitries), as one or more programs running on one or more processors (e.g., microprocessors), as firmware, or as virtually any combination thereof.

In addition, those skilled in the art will appreciate that example mechanisms disclosed herein may be capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined with one another to provide further embodiments. For example, two or more of example embodiments described above may be combined to, for example, improve the safety of laser printing and reduce the risks associated with laser-related accidents and injuries. These and other changes may be made to the present systems and methods in light of the above detailed description. Accordingly, the disclosure is not limited by the disclosure, but instead its scope is to be determined by the following claims.

What is claimed is:

1. A media guide assembly for a printing apparatus, the media guide assembly comprising:

a back spine;

a first media guide configured to define a first section of a media path, wherein the first media guide comprises an arch profile, wherein the first media guide comprises a first planar section and a second planar section; and a media sensor configured to generate signals indicative of a location of a print media;

a shaft coupled to the back spine, wherein the first planar section and the second planar section are positioned above the shaft along a vertical axis of the printing apparatus, causing the print media to be in a contact with the shaft as the print media traverses along the media path, wherein the shaft receives the media sensor.

2. The media guide assembly of claim 1, wherein the first media guide and a second media guide are placed along the vertical axis of the printing apparatus, wherein the first media guide and the second media guide face opposite to each other.

3. The media guide assembly of claim 2, wherein the first media guide is configured to be positioned at a vertical distance from the second media guide.

4. The media guide assembly of claim 3, wherein the vertical distance is defined based on a media thickness.

5. The media guide assembly of claim 1, wherein the first media guide comprises a valley region.

6. The media guide assembly of claim 5, wherein a first media guide section of the first media guide is configured to receive a light receiver in the valley region.

7. The media guide assembly of claim 1, further comprising a second media guide, wherein the second media guide comprises at least a peak region.

8. A printing apparatus comprising:

a media supply spool configured to supply a print media along a media path;

a back spine;

a first media guide configured to define a first section of the media path, wherein the first media guide comprises an arch profile, wherein the first media guide comprises a first planar section and a second planar section; and a media sensor configured to generate signals indicative of a location of the print media;

a shaft coupled to the back spine, wherein the first planar section and the second planar section are positioned above the shaft along a vertical axis of the printing apparatus, causing the print media to be in a contact with the shaft as the print media traverses along the media path, wherein the shaft receives the media sensor.

9. The printing apparatus of claim 8, wherein the first media guide and a second media guide are placed along the vertical axis of the printing apparatus, wherein the first media guide and the second media guide face opposite to each other.

10. The printing apparatus of claim 9, wherein the first media guide is configured to be positioned at a vertical distance from the second media guide.

11. The printing apparatus of claim 10, wherein the vertical distance is defined based on a media thickness.

12. The printing apparatus of claim 8, wherein the first media guide comprises a valley region.

13. The printing apparatus of claim 12, wherein a first media guide section of the first media guide is configured to receive a light receiver in the valley region.

14. The printing apparatus of claim 8, further comprising a second media guide, wherein the second media guide comprises at least a peak region.

15. A printing apparatus comprising:

a back spine;

a media supply spool configured to supply a print media along a media path;

a first media guide configured to define a first section of the media path, wherein the first media guide comprises an arch profile, wherein the first media guide comprises a first planar section and a second planar section; and a media sensor configured to generate signals that are indicative of a location of the print media;

a shaft coupled to the back spine, wherein the first planar section and the second planar section are positioned above the shaft along a vertical axis of the printing apparatus, causing the print media to be in a contact with the shaft as the print media traverses along the media path, wherein the shaft receives the media sensor.

16. The printing apparatus of claim 15, wherein the first media guide and a second media guide are placed along the vertical axis of the printing apparatus, wherein the first media guide and the second media guide face opposite to each other.

17. The printing apparatus of claim 16, wherein the first media guide is configured to be positioned at a vertical distance from the second media guide.

18. The printing apparatus of claim 17, wherein the vertical distance is defined based on a media thickness.

19. The printing apparatus of claim 15, wherein the first media guide comprises a valley region, wherein a first media guide section of the first media guide is configured to receive a light receiver in the valley region.

20. The printing apparatus of claim 15, further comprising a second media guide, wherein the second media guide comprises at least a peak region.

* * * * *